Aug. 8, 1933. E. S. CARPENTER 1,921,214
COOLING MEANS FOR MOTION PICTURE PROJECTORS
Filed May 10, 1932 2 Sheets-Sheet 1

Inventor
Ernest S. Carpenter
By Waters, Golrick & Tear
Attorney

Aug. 8, 1933.  E. S. CARPENTER  1,921,214
COOLING MEANS FOR MOTION PICTURE PROJECTORS
Filed May 10, 1932  2 Sheets-Sheet 2

Inventor
Ernest S. Carpenter,
By Bates, Golrick & Team,
Attorney

Patented Aug. 8, 1933

1,921,214

UNITED STATES PATENT OFFICE 1,921,214

COOLING MEANS FOR MOTION PICTURE PROJECTORS

Ernest S. Carpenter, Cleveland Heights, Ohio, assignor to The Augustus-Carpenter Company, Cleveland, Ohio, a Corporation of Ohio Application May 10, 1932. Serial No. 610,419

17 Claims. (88—24)

This invention relates to a motion picture projector having such internal passageways for air that a fan operated by the motor may maintain the motor and the lamp cool during the operation of the machine. One of the objects of the invention is to provide a very simple arrangement within the hollow frame of the projector for accomplishing this result. Another feature of the invention relates to means for causing the greatest diminution of temperature of the lamp at a region thereof which is out of the line of the reflected or projected rays, so that the gradual internal deposit in the lamp (which takes place at its coolest region) will not interfere with the efficiency of illumination.

The above, and other features of the invention, are hereinafter more fully explained in connection with the description of a preferred embodiment illustrated in the drawings.

Figure 1:
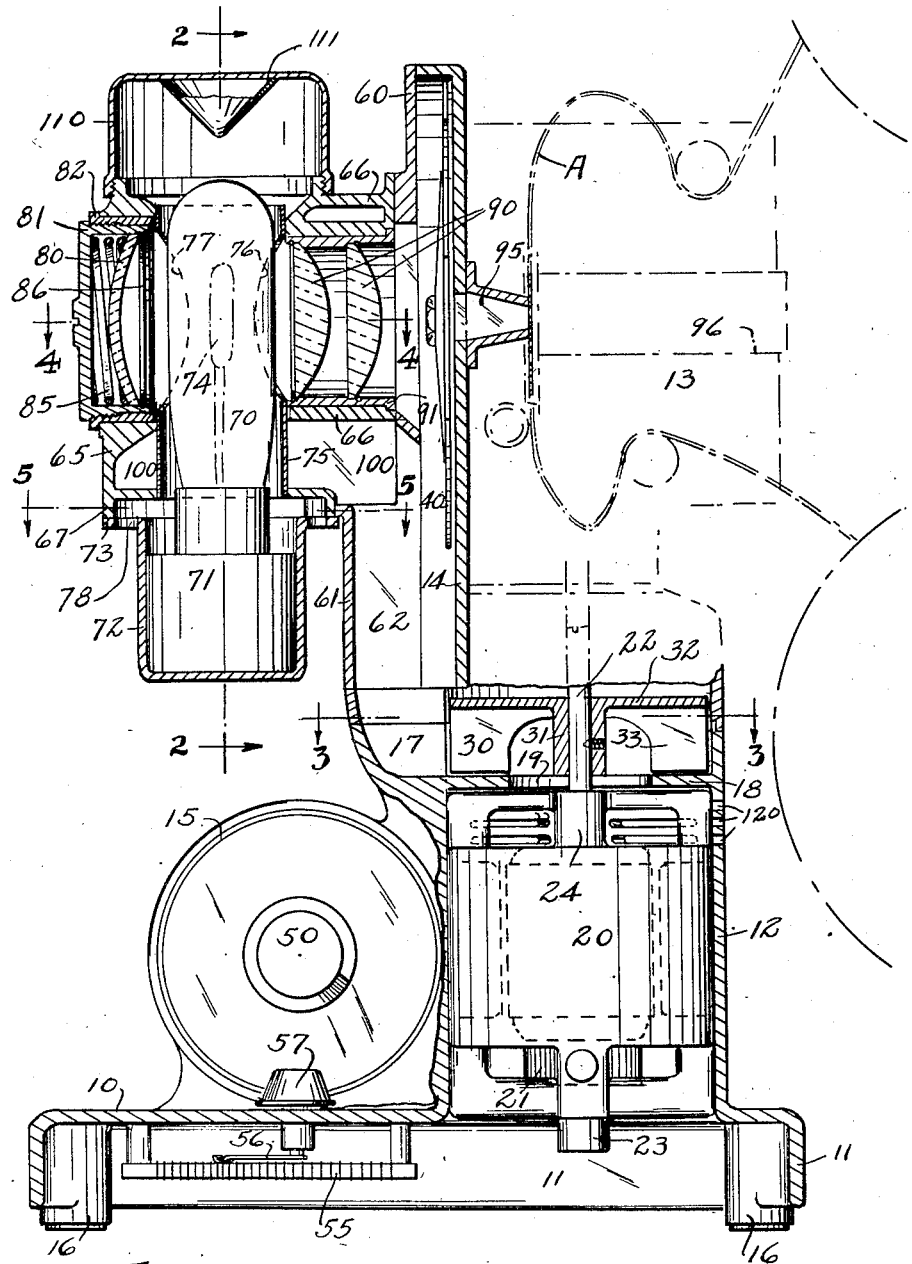
Fig. 1 is a vertical section through a motion picture projector equipped with my air-cooling means, the reels, film, film feed and lens barrel being merely indicated by broken lines.
Figure 2:
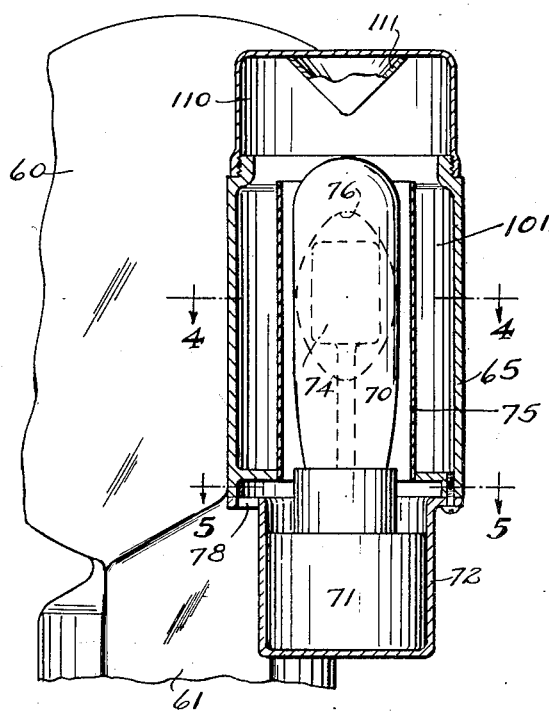
Fig. 2 is a vertical section through the lamp housing in a plane at right angles to Fig. 1, as indicated by the line 2—2 on Fig. 1.
Figure 3:
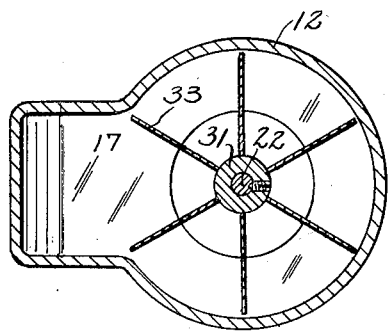
Fig. 3 is a horizontal section through the fan, on the line 3—3 on Fig. 1.
Figure 4:
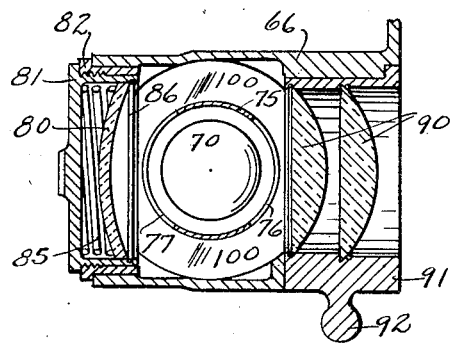
Figure 5:
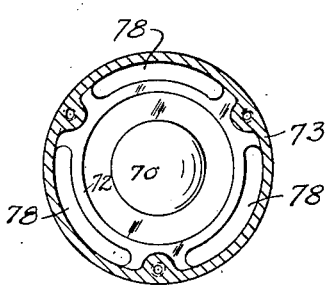

Figs. 4 and 5 are horizontal sections on the lines 4—4 and 5—5 on Figs. 1 and 2.

As shown in Fig. 1, the hollow frame of the projector includes a substantially rectangular base having a horizontal plate 10, with a depending edge flange 11, and an upright cylindrical barrel 12 adapted to house the motor 20 and fan 30. This upright barrel carries an upper flattened portion, indicated by broken lines 13, in and on which is the film-feeding mechanism driven by the motor. This upper portion terminates at the rear in a transverse approximately circular housing for the shutter 40. The frame also has the lateral portion 15 above the base and at the rear of the barrel 12 which may house the controlling switch 50. The base has suitable feet 16 for holding the lower edge of the border flange 11 a suitable distance above any supporting surface, to provide sufficient space beneath the flange for the passage of air into the interior of the frame.

Mounted in the tubular standard 12 is the field frame 20 of a vertical motor. The armature 21 of this motor is mounted on a vertical shaft 22 journalled in bearings 23 and 24 carried by the field frame. Directly above the bearing 24, the frame has a transverse partition 18 with a central opening 19. Above the partition 18 is the fan 30 composed of a hub 31 mounted on shaft 22, a top plate 32 and downwardly extending blades 33 carried by the top plate. These blades are cut away adjacent the hub 31 as shown in Fig. 1 to allow ample passage of air through the opening 19 into the central region of the fan.

When the motor is operated, a considerable volume of air is drawn from beneath the base upwardly through the annular space between the armature and field, through the opening 19 into the fan, and thus discharged laterally into a passageway 17 in the frame at the side of the fan.

The arrangement just described serves to maintain the motor cool whenever the machine is operated. The speed of the motor is preferably governed by a rheostat having its winding 55 mounted beneath the base plate 10 and its controlling arm 56 operable by a knob 57 above the base plate. Accordingly, the same passage of air which cools the motor serves to maintain the rheostat cool.

At the rear of the housing 14 for the shutter is a closure plate 60 rigidly secured to the flange of the housing and formed on its lower portion with a rearward offset 61 to provide an upwardly extending internal passageway 62 communicating with the air passageway 17 at the rear of the fan. This plate 60 carries the housing for the lamp, reflector and condensing lens, which will now be described.

The lamp housing comprises a vertical barrel 65 intersected by a horizontal barrel 66, the two barrels being preferably one integral member secured directly to the rear plate 60 of the shutter housing. The vertical barrel of this compound housing is designed to receive a lamp, while the horizontal portions carry the reflector and the condensing lens.

As shown in Figs. 1 and 2, the lamp 70 is mounted in a socket 71 carried by an upwardly facing cup 72 which has a lateral flange 73 removably secured to the underside of annular flange 67 formed on the lamp housing. This same flange 67 carries a vertical tube 75 which surrounds the lamp and has elliptical openings 76 and 77 through it respectively in front of and behind the active portion of the filament 74 of the lamp.

The reflector is shown as comprising a curved member 80 mounted in a cup 81 having a cylindrical wall which screws into the rear end of a bushing 82 set into the horizontal barrel portion of the housing. As shown, the reflector 80 is pressed forward by a spring 85 against a retaining ring 86 mounted in a recess in the inner surface of the cylindrical wall 81. This provides a readily removable reflector.

The condensing lenses designated 90 are shown as mounted in a casing 91, which is preferably rectangular in vertical section and slides into the space directly in front of the lamp. This casing 91 is shown in Fig. 4 as having a knob 92 by which it may be pulled out horizontally to enable cleaning of the lenses. When in place, as shown in the drawings, the lenses 90 are axially aligned with the filament and reflector and with the frame passageway 95 and with the projecting-lens barrel 96. The film, indicated at A, passes between the passageway 95 and the lens barrel 96.

It will be seen from the construction described that the rays of light from the filament pass, partly directly and part by reflection, through the condensing lens, and thence under the control of the shutter through the film for projecting the image.

Reverting now to the means for cooling the lamp, it will be seen from Fig. 1 that the lamp housing provides a passageway 100 leading laterally from the upwardly extending passageway 62 to the space outside of the lamp shield 75. This passageway communicates with a comparatively large upwardly extending annular space 101 between the shield 75 and the barrel 65. This space is small directly at the mid-vertical plane of the lenses, in which plane Fig. 1 is taken, but, as shown in Figs. 2 and 4, is of considerable cross-sectional area in all other regions, and thus provides ample space for the passage of air in the form of a tubular envelope upwardly about the shield 70.

In its upward course, the air passes into a cap 110 screwed onto the top of the lamp housing 65. This cap carries internally a downwardly extending hollow cone 111, with the result that the air passing upwardly in the annular course is deflected downwardly by the cone to impinge directly against the crowned top of the lamp 70. The air then passes downwardly between the lamp and its shield 75 into the space around the socket 71, and thence passes outwardly through various openings 78 in the flange 73 of the socket cup 72.

As more air is needed for cooling the lamp than for the motor and rheostat, I provide additional openings into the frame above the motor. Such openings are shown in Fig. 1 at 120 and consist of arcuate slots made through the frame barrel 12 above the motor frame and beneath the partition 18.

I will recapitulate the course of the air when the machine is operated, this air being drawn in and propelled by the fan 30. Much of this air comes from beneath the flange of the base, passing across the rheostat winding, thence upwardly in an annular course between the field and armature of the motor. This air is then augmented by air coming through the arcuate slots 120 and all of the air then passes through the opening 19 into the fan housing and is propelled by the fan laterally into the passageway 17; thence upwardly along the passageway 62; thence laterally in the passageway 100 about the shield tube 75; thence upwardly in an annular course between the shield tube 75 and the wall 65 of the lamp housing, into the outer portion of the cap 110. There, the annular air course curves inwardly upon itself under the influence of the deflector 111, and passes downwardly centrally striking the top of the lamp; and thence about the dome of the lamp and downwardly along the annular space between the lamp and the shield into the cavity surrounding the socket, from which it passes outwardly through the arcuate opening 78 in the flange of the socket cap.

The forced ventilation in the lamp housing, together with the mountings for the reflector and lens units, reduces the expansion of these units which materially reduces the tendency of the lens or reflector to crack by equalizing the stresses in such members. As shown in Figs. 1 and 4, the reflector mounting 81 and the lens mounting 66 are metallic block-like members, which closely fit their respective housings. As the air is forced upwardly around the housing 75 it cools the lens and the reflector, as well as their respective mountings, and housings. This is especially true in the instance of the lens housing as the cool air is forced along its bottom wall.

Though the air may be heated somewhat by the rheostat and the motor, it is cooled by the additional air coming through the openings 120 and thus when it reaches the cap 110 is comparatively cool and, passing downwardly onto the dome of the heated lamp, immediately cools the dome portion; and thence, in passing downwardly along the lamp, abstracts heat therefrom and itself becomes heated as its passes to its discharge. The result is that the dome of the lamp is maintained cooler than the portions thereof in the region of the filament, and, accordingly, the condensed filament products are deposited on the dome portion of the lamp, while the portion adjacent the reflector and lenses is maintained clear. Accordingly, even though the lamp is continued in use, the illumination is not reduced and hence the efficient life of the lamp is increased.

I claim:

1. In a motion picture projector, the combination of a frame having a hollow base with means for admitting air thereinto, the frame having a hollow barrel extending upwardly from the base and communicating with the space within it, a lamp housing carried by the frame, a vertical shaft mounted in the hollow barrel, a motor drivingly connected to said shaft, and a fan carried by the shaft and adapted to draw air from the base and between the field and armature of the motor and discharge the same along a passageway within the frame leading into the lamp housing.

2. In a motion picture projector, the combination of a hollow frame, a lamp housing carried thereby having means for supporting a lamp, a shield about the lamp, a motor driven fan and air passageways to direct air in an annular course outside of the shield and within the lamp housing, and means for deflecting such air onto the lamp, whereby it passes along the annular space between the shield and lamp.

3. In a motion picture projector, the combination with a frame, a lamp housing carried thereby and having intersecting vertical and horizontal barrel portions, a lamp in the vertical barrel portion, a shield in the vertical barrel portion outside of the lamp, said shield having openings in front of and behind the filament of the lamp, a reflector in the horizontal barrel portion behind the filament, a condensing lens in the horizontal barrel portion in front of the filament, and means for propelling air along the outside of the shield and thence along the inside thereof.

4. In a motion picture projector, the combination of a lamp, a shield about the lamp, an air deflector beyond the lamp, and means for propelling air along the outside of the shield and against the deflector, such air being thence deflected by the deflector onto the lamp and into the space between the lamp and shield.

5. In a motion picture projector, the combination of a frame, a lamp housing carried thereby, a socket carried by the housing, a lamp in the socket, a shield about the lamp, a cap secured to the housing, a deflector on the interior of the cap, and means for propelling air along the outside of the shield into the cap, such air being thence deflected by the deflector onto the lamp and into the space between the lamp and shield.

6. In a motion picture projector, the combination of a frame, a lamp housing carried thereby and having an upright space for the lamp and a horizontal space for the condensing lens, a removable cup secured to the housing and carrying the lamp socket, a cap secured to the housing and having an internal deflector, and means for directing the air into said cap whereby it passes along the exterior of the lamp into the space about the socket, there being suitable openings through which it is discharged.

7. In a motion picture projector, the combination of a frame, a lamp housing carried thereby, a cup carrying the lamp socket and adapted to be secured to the housing, said cup having an annular flange with openings through it into the space in the housing about the socket, a shield tube carried by the housing about the lamp which is in the socket, and means for projecting air in one direction outside of the tube and thence in the opposite direction between the lamp and tube and discharging it through the openings in the flange of the socket cup.

8. In a motion picture projector, the combination of a frame having a base with a hollow standard rising therefrom, there being space for the passage of air beneath the edge of the base, a motor and fan mounted in the hollow standard, openings through the standard above the motor and beneath the fan into the space leading to the fan housing, a lamp housing, a passageway from the fan housing to the lamp housing, said lamp housing having means for carrying the lamp, a shield about the lamp, passageways for directing air along the outside of the shield, a cap into which such air is directed, and a deflector within the cap serving to return the air into the space between the lamp and shield.

9. In a motion picture projector, the combination of a frame, a lamp housing carried thereby, a lamp within the lamp housing, a condensing lens through which light from the lamp may pass, a shield within the housing about the lamp, and means for forcing air along a passageway within the housing and outside the shield and thence between the lamp and shield.

10. In a motion picture projector, the combination of a frame, a lamp housing carried thereby, a shield within the housing about the lamp, there being an opening through the shield, a condensing lens in line with the opening, means for forcing air along a passageway within the housing and outside the shield to a region beyond the lamp and shield, and means for deflecting such air to cause it to strike against the dome of the lamp.

11. In a motion picture projector, the combination of a hollow frame, a driving motor carried within the frame, a lamp housing carried by the frame, a lamp within the housing, a shield within the housing about the lamp, a fan operated by the motor, and passageways for air from beneath the base of the frame upwardly through the motor and thence in one direction outside of the shield and thence in the opposite direction between the shield and the lamp.

12. In a motion picture projector, the combination of a hollow frame, a lamp housing carried thereby having means for supporting a lamp, a shield about the lamp having an opening, a condensing lens in registration with the opening, a motor-driven fan and air passageways to direct air in an annular course outside of the shield and within the lamp housing, and means for deflecting such air onto the lamp whereby it passes along the annular space between the shield and lamp.

13. In a motion picture projector, the combination with a frame, a lamp housing carried thereby and having intersecting vertical and horizontal barrel portions, a lamp in the vertical barrel portion, a shield in the vertical barrel portion outside of the lamp, said shield having openings in front of and behind the filament of the lamp, a reflector in the horizontal barrel portion behind the filament, a condensing lens in the horizontal barrel portion in front of the filament, and means for propelling air along the outside of the shield and thence along the inside thereof.

14. In a motion picture projector, the combination of a frame, a lamp housing carried thereby, a lamp socket, a lamp carried thereby in the housing, means for propelling air into the housing, and means for directing such air against the dome of the lamp and thence along the side surface of the lamp toward the socket thereof.

15. In a motion picture projector, the combination of a frame having a base open at the bottom, and having an edge flange and means for holding the same some distance above a support to enable entrance of a comparatively large amount of air into the base, an upright hollow standard of materially less lateral extent than the base communicating with the base, a lamp house communicating with the hollow standard and offset therefrom, but over the base, a vertical shaft within the hollow standard, a motor within the hollow standard, drivingly connected to said shaft, and a fan on the shaft adapted to propel air from under the base, between the field and armature of the motor, and about the lamp in the lamp house.

16. In a motion picture projector, the combination of a hollow base having a hollow standard communicating therewith, a lamp housing carried by the standard above and at one side thereof, a motor in the hollow standard having a vertical armature shaft, a fan on said shaft, in a chamber above the motor, and an air passage leading upwardly from one side of said chamber into the lamp housing, there being provision for admitting air into the hollow base, whereby air may pass into the hollow standard and between the armature and field of the motor and thereafter about the lamp to cool both the motor and lamp.

17. In a motion picture projector, the combination of a hollow base having means for admission of air thereto, and having an upright standard communicating therewith, an upright motor mounted within the standard, a fan on the vertical motor shaft above the motor, there being space for the passage of air from the base upwardly between the armature and field of the motor, openings through the frame between the motor and fan to augment the air passing to the fan, the frame having a fan chamber with a lateral extension, a lamp housing supported by the standard and having a passageway communicating with said lateral extension, a socket, a lamp carried thereby and extending upwardly in the housing, and means for directing the air received from the fan downwardly against the dome of the lamp and thence along the lamp toward the socket.

ERNEST S. CARPENTER.